Dec. 19, 1961     L. G. SIMJIAN     3,013,344

VEHICULAR TRAINING DEVICE

Original Filed Dec. 4, 1957     2 Sheets-Sheet 1

INVENTOR.
LUTHER G. SIMJIAN

BY

AGENT.

Dec. 19, 1961 L. G. SIMJIAN 3,013,344
VEHICULAR TRAINING DEVICE
Original Filed Dec. 4, 1957 2 Sheets-Sheet 2

INVENTOR.
LUTHER G. SIMJIAN
BY
AGENT.

UNITED STATES PATENT OFFICE 3,013,344
Patented Dec. 19, 1961

3,013,344
VEHICULAR TRAINING DEVICE
Luther G. Simjian, Greenwich, Conn., assignor to Reflectone Electronics, Inc., Stamford, Conn., a corporation of Connecticut
Original application Dec. 4, 1957, Ser. No. 700,648. Divided and this application Dec. 8, 1959, Ser. No. 858,294
7 Claims. (Cl. 35—11)

This application is a divisional application of my copending application for U.S. Letters Patent, Serial No. 700,648, entitled "Training Device," filed December 4, 1957.

This invention generally refers to improvements in training devices and has particular reference to a novel and useful means for training, testing, analyzing and recording the actions and reactions of persons in operating certain control mechanisms. More specifically, the invention is related to a classroom training device adapted to present varying visual stimuli to a trainee position or station and wherein controls at the trainee position may be used to modify certain programmed sequences.

The invention specifically is directed to providing a novel and useful mechanism for teaching persons the handling of power operated vehicles, such as automobiles, boats, airplanes, etc. While the primary object of this training device is the training and instructing of novices, it will be found that the device is equally useful for evaluating the capability and proficiency of drivers possessing already a certain amount of experience and skill. In this manner, the instant training device, as will be apparent from the following description, constitutes an extremely valuable and versatile tool for the ever increasing demand and need for driver education and evaluation.

The recent rapid increase in moving vehicles and the alarming rise of the accident rate with the resultant loss to human life and property has focussed renewed attention on the problem of driver education and driver evaluation and pointed out the need for an apparatus which in a realistic manner would serve to teach and evaluate a driver in his actions and reactions when operating a power-driven vehicle. Such an apparatus in order to be useful must be suitable in connection with driver teaching classes where either a single or a plurality of students is trained.

Although the prior art shows various trainers of this type, many of the prior art devices known and evaluated exhibit severe shortcomings, such as inadequate realism and lack of realistic presentation with regard to wrong actions by an individual student, specifically when group training is involved.

The instant application discloses a trainer which has been designed to overcome the above mentioned shortcomings by providing realism not only to each single student but by designing the trainer in such a manner that it may be used equally well for group training. The trainer is entirely a self-contained unit which is readily transportable for classroom use. Several trainers in parallel may be used in a single installation without affecting the training value at each single station. To this end, the invention provides a trainer which tests the ability of an individual to handle the vehicle controls under numerous situations, these situations occurring on a programmed or random schedule. The mechanism is designed to dictate and analyze the actions of the operator and record any wrong actions. Furthermore, any wrong action becomes visible to the respective operator immediately so that he is made aware of his fault or shortcoming without having to await final evaluation or critique. Moreover the trainer provides a very simple means to inject varying obstacles into the path of the driver so that the driver is forced to take evasive action and avoid collision. The course of action to be followed by the driver to avoid such a collision is completely left to the judgment and discretion of the driver and may comprise slowing, stopping, turning, etc., so that judgment as to speed and distance form an important part of the training. In the event that the driver is unable to take proper evasive action and a collision actually occurs, the collision presentation is spontaneous and realistic.

In conformity with the foregoing, in its present and preferred embodiment the invention provides a trainee position which is equipped with the usual vehicle controls—in the case of an automobile—steering wheel, gear shift, brake, clutch and accelerator pedals. In front of the trainee position there is disposed a small object which represents a portion of the automobile which the trainee is controlling. A terrain presentation, for instance an endless belt, moves relative to the object, the speed of the belt relative to the object and the lateral position of the object relative to the belt are controlled by the trainee. Means are provided to cause a continuously changing road pattern on the belt. It is the trainee's problem to steer the object in such a manner that the boundaries of the roadway on the belt are not exceeded. The longitudinal speed of the belt is adjustable by the instructor and may be influenced still further by the controls at the trainee position.

In order to simulate obstacles, an apparatus is provided which injects a marking or small three-dimensional objects into the moving roadway and the problem presented to the trainee is therefore to take suitable action so as to avoid collision of the simulated vehicle under his control with the obstacle. In the event that collision occurs, realistic presentation becomes immediately visible to the trainee.

The training device is equipped with scoring means to produce a record of wrong actions of the operator particularly when exceeding the road boundaries or when causing collisions due to improper handling techniques.

One of the objects of this invention is therefore the provision of a novel and improved training device which is useful for teaching and evaluating persons in the operation and handling of power driven vehicles.

Another object of this invention is the provision of a self-contained trainer readily operable in single or plural units.

Another object of this invention is the provision of a driving trainer which presents to a student realistic conditions so as to cause the student to acquire driving skill and proficiency.

Another object of this invention is the provision of a vehicle training device in which the actions taken by the student are apparent to the student at once regardless as to whether individual or group training is involved.

A further object of this invention is the provision of a training device which is equipped with means to present variable and varying road path patterns to the student.

A further object of this invention is the provision of a driving trainer in which certain characteristics of an actual vehicle are simulated.

A still further object of this invention is the provision of a training device which is equipped with means for scoring and evaluating student performance.

A further and other object of this invention is a training device for driver trainees in which obstacles may be inserted in the path of the student in a random manner.

A further and other object of this invention is the provision of a driver trainer wherein the course of action to be followed by a student to avoid obstacles and collision is left to the judgment of the student.

Another and still further object of this invention is the provision of a driving trainer wherein scoring is provided to record the occurrence of a collision between the vehicle of the trainee and an obstacle.

Further and still other objects of the instant invention will be apparent from the following description taken in conjunction with the accompanying drawings in which.

Figure 1:
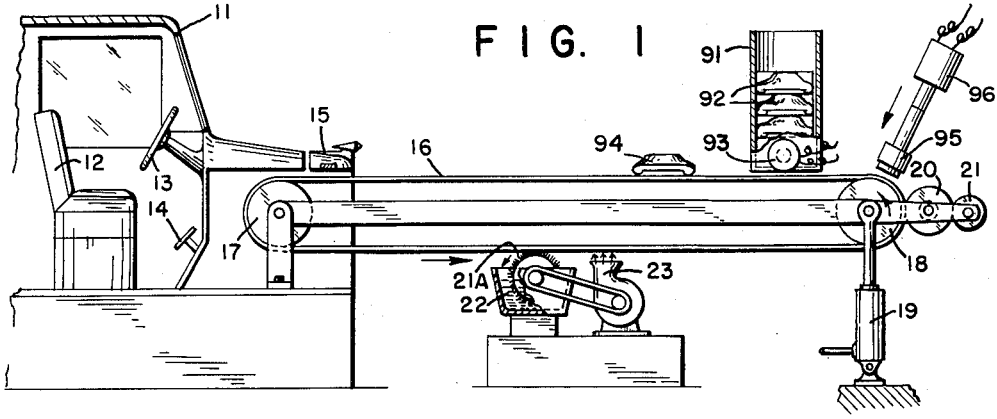
FIGURE 1 is a view in longitudinal section, partly schematic, of the training device.

Referring now to the figures and FIGURE 1 in particular, numeral 11 identifies a trainee position such as the cab of an automobile which is to be occupied by the student. It will be apparent that such a student position may resemble the operator's position on a ship, aircraft, etc. without departing from the scope of the instant invention. Within this cab there will be found a seat 12, a steering wheel 13, and suitable foot pedals 14.

In view of the trainee's position there is disposed a portion of the vehicle such as the front portion of a hood 15 which may include a hood ornament. This hood portion, or object, is distinct from the cab 11 and is movable laterally with respect to a moving endless belt 16 disposed in front and below the object 15. The endless belt 16 represents visual stimulus means in the form of road information and moves longitudinally toward the object 15.

The terrain belt 16 is driven about spaced rollers 17 and 18 at a speed which represents driving speed. The center axis of roller 18 is supported by means of an elevating mechanism, for instance, a hydraulic cylinder 19 so that the belt at the far end (roller 18) may be tilted upward or downward with respect to object 15 and cab 11 to simulate upgrade or downgrade road conditions. The lateral or transverse motion of object 15 relative to the longitudinal axis of belt 16 is controlled from steering wheel 13. One of the objects of this trainer is to impart steering skill to the student. To this end, cooperating with the belt there is a set of marking rollers 20 which receive a suitable marking liquid from a set of ink rollers 21. Each marking roller 20 is in contact with the belt at roller 18 and is used to mark a lateral boundary representing the limit of a roadway on the belt. After the marking has passed object 15, the marking becomes erased by cleaning means which include a rotary brush 21A revolving in a suitable cleaning solution 22 followed by a hot air drying device 23.

It will be apparent that such marking may comprise pencil marking, inking means, application of magnetic powder, marking by means of heat, application and removal of adhesive tape or similar means without deviating from the principle of the invention.

Figure 2:
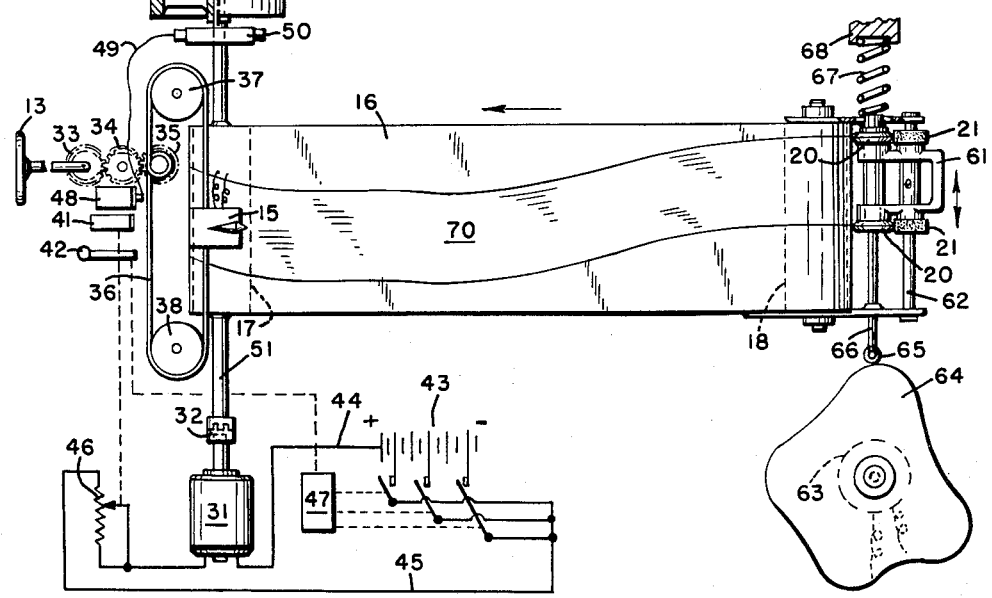
FIGURE 2 is a plan view of the training device illustrating more closely portions of FIGURE 1.

FIGURE 2 illustrates more closely some of the mechanisms and components involved in operating the device per FIGURE 1. Motor 31 drives the road belt via a coupling 32 and roller 17 about which the endless belt 16 rotates. Belt 16 may be made of fabric, impregnated fabric, plastic material, so that the belt is readily flexible as well as capable of being marked repetitively with road boundaries. The steering wheel 13 via a set of suitable gears 33, 34, and 35 drives a flexible cable 36 which is fastened around the side of gear 35. The flexible cable 36 after being guided about pulleys 37 and 38 is fastened to object 15 so that motion of steering wheel 13 causes a corresponding lateral or transverse motion of object 15 relative to the belt 16.

The speed of driving motor 31 is influenced by the accelerator pedal 41 and gear shift lever 42. Motor 31 is driven from a source of electric energy 43 via conductor 44, a series of toggle switches in parallel, conductor 45 and via adjustable resistor 46. The three switches shown represent first, second and third gear shift position on an automobile and it will be understood that one switch at a time is closed. The switches are actuated by gear shift lever 42 engaging a suitable cam device 47 which in turn closes one of the three toggle switches. It will be seen that the switches, from left to right, pick up increasing voltage so that maximum voltage represents the highest speed gear in an automobile. Rheostat 46 is controlled by the accelerator pedal 41 to simulate the action of the gas pedal in an automobile. It will be apparent that the rheostat 46 may be a shaped function potentiometer to simulate actual characteristics of an engine. For the sake of simplicity the clutch pedal is not shown but it readily can be coupled to cam means 47. It will be apparent to those skilled in the art that as an alternate design actual mechanical gear ratios and gear shifting means may be employed which are coupled between the motor and the roller 17 without departing from the principle shown.

The brake pedal 48 via a flexible cable 49 controls a brake disk and brake shoe arrangement 50 operatively coupled to drive shaft 51 so that operation of brake pedal 48 causes a braking action on drive shaft 51 which is driven by motor 31. Drive shaft 51 still further is provided with an inertia means, flywheel 52, in order that the belt cannot be slowed or accelerated suddenly, but that the motion of the road belt relative to the object 15 is provided with suitable inertia which represents the dynamic characteristics of a moving vehicle. Moreover, an inertia switch 53 in a similar manner is fastened to the drive shaft 51, this inertia switch causing an electrical circuit contact operation during sudden mechanical acceleration or deceleration of the shaft 51. This contact operation is used for scoring purposes to indicate whether sudden acceleration or deceleration due to improper operation of the driving controls has occurred. Switches of this type are well known in the art in conjunction with measuring of acceleration or deceleration and need not be described in further detail.

It will be apparent to those skilled in the art that the adjustment of the brake shoe and brake disk may be made subject to wide variation to simulate varying road conditions. A device of this type may include spring means and clutch facing depending upon the road conditions to be simulated. In this manner, the friction may be changed to simulate conditions involving dry roads to those involving wet roads and icy conditions.

The road marking device involving the establishing of lateral boundaries will be apparent by referring to the following details:

The two marking wheels 20 in contact with ink supply wheels 21 are supported in a movable bracket 61 which is adapted to slide laterally along transverse shaft 62. The bracket 61 is driven along its lateral excursion by means of a motor 63 coupled to an irregularly shaped cam 64 via cam follower 65 and push rod 66. The marking wheels and bracket are resiliently biased toward the cam by spring 67 which is confined between reference point 68 and the bracket 61.

As the motor 63 rotates cam 64, the bracket 61 with marking wheels is in oscillatory motion and causes a pair of lateral boundary marks on belt 16 thereby providing a road 70 defined between the markings. It will be apparent that depending upon the contours of the cam 64, the marked road can be changed from a simple straight road to a continuously curved road and that by changing the distance between the marking wheels, the road may be wide or narrow. Moreover, it will be observed that the road pattern is changing continuously and that if the cam contour is of sufficient length with respect to the linear length of the belt, the pattern is changing without establishing a repetitive pattern during a single revolution of the belt. If cam 64 is driven at a slow rate the problem presented to the trainee, having to confine object 15 within the lateral boundaries of the road, will be less difficult than when driving cam 64 at a high speed in which case the resultant road pattern will be changing more rapidly. When it is desired to repeat a certain road pattern in a repetitive manner, for instance for the initial phases of training or when simulating a short difficult road, it is obvious that the marking device may be disabled by lifting it away from the belt so that the pattern established on the belt will remain. In this event, it will be necessary to disable also the erasing means comprising brush, bath and blower means 21, 22, and 23 respectively of FIGURE 1. By providing a third marking wheel, disposed between the marking rollers 20 shown, a center-line of the road is achieved.

FIGURE 1 illustrates furthermore a method for providing obstacles on the terrain means thereby forcing the trainee to take evasive action in order to avoid collision. To this end, a hopper 91 is mounted laterally with respect to the terrain means 16. The hopper houses three-dimensional obstacles such as model cars 92 which are ejected from the hopper onto the terrain means by solenoid 93. When energizing solenoid 93 an obstacle 92 is placed on the belt and moves toward the position of object 15 such as obstacle 94 being depicted as travelling toward the trainee position. When an obstacle is placed on the terrain means it is obviously at rest on the terrain means, giving the illusion of a parked car or stationary obstacle on the road. When it is desired that the obstacle move toward or away from object 15, the obstacle is mounted readily on a platform which moves at a relative speed with respect to the terrain means. In this manner the object may be made to approach or be moving away from the vehicle under control of the trainee.

Similarly, it is possible to provide the belt with imprinted obstacles using a stamp 95 actuated by solenoid 96. In this manner the belt may be provided with a stationary obstacle for instance, excavation, manhole cover, or other objects to be avoided by the driver of a vehicle.

Instead of the use of a hopper or stamp, an obstacle can readily be projected onto the terrain 16 by means of an optical projection means and if desired, the projector may either move on tracks or pivot about a fixed axis in order that the obstacle projected onto the terrain move either with the terrain or at a differential speed relative thereto.

Figure 3:
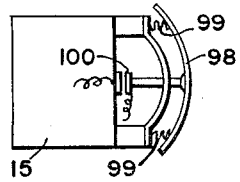
FIGURE 3 is a plan view depicting collision sensing means on the object which is under control of the student.

FIGURE 3 shows a typical means for sensing collisions between an obstacle and the vehicle under control by the trainee. The object 15 is provided at its front end with a bumper 98 resiliently mounted by means of springs 99. As the bumper 98 collides with obstacle 94, the bumper moves toward the frame of object 15 and causes closing of a set of electrical circuit contacts 100. Closing of these contacts will cause scoring on an indicator which will be described in connection with FIGURE 7. The obstacle, by virtue of the curved bumper, becomes deflected and may be collected at the side and rear of the moving terrain belt. In this manner realistic presentation of a collision is achieved as it occurs. When desired, the closing of contacts 100 may be synchronized with noise, smoke simulation, etc. to provide realism to the extent of further visual and audible simulation. Moreover, the closing of contacts 100 may be utilized to rapidly stop motion of the terrain means thereby simulating the conditions when experiencing an actual collision.

Figure 4:
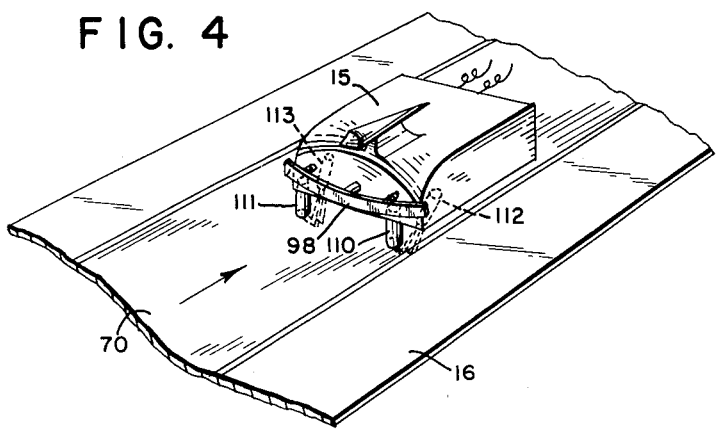
FIGURE 4 is a perspective view of the object disposed above the terrain means and incorporating sensing means for producing a signal when the lateral boundary is exceeded.
Figure 5:
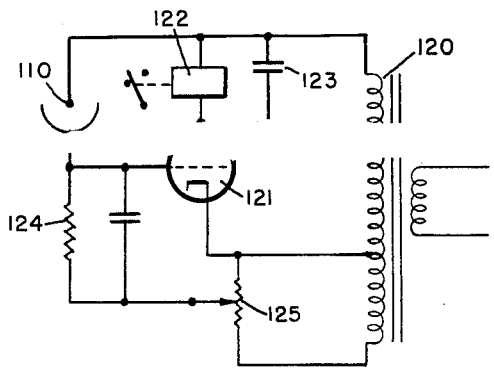
FIGURE 5 is a schematic electrical circuit diagram of a typical electronic circuit usable in conjunction with photoelectric means.

FIGURE 4 is a perspective view of the object 15 disposed above the terrain means and illustrates a typical means for sensing the condition when the object exceeds the lateral boundary of the terrain means. Object 15 is provided with a set of small tubular photoelectric tubes 110 and 111 respectively, which cooperate with a pair of light sources, numerals 112 and 113 for picking up light reflection from the terrain means. As the object is moved laterally relative to the terrain belt, the boundary line established by the marking means is sensed by either one of the photoelectric cells which causes a signal on a scoring circuit. It will be apparent that optical color filters may be employed in order to provide suitable circuit actuation and to exclude ambient sources of light. A typical electronic circuit cooperating with a photoelectric cell is shown in FIGURE 5. This circuit comprises a transformer 120 which applies a voltage to an electron tube 121. The anode of tube 121 is series connected with the coil of an electromagnetic relay 122 connected in parallel with a capacitor 123. Photoelectric cell 110 is connected also in series with a resistor 124. Resistor 125 provides a bias to the control electrode of tube 121. The operation of the circuit is as follows:

When photoelectric cell 110 is not excited by light, the control electrode of tube 121 is held at a negative potential with respect to the cathode so that there is little or no current flow through the coil of relay 122. When light strikes however, photoelectric cell 110, the control electrode of tube 121 becomes more positive with respect to the cathode and current will flow through the tube 121 thereby causing actuation of relay 122. Obviously, photoelectric cell 110 may be connected in parallel with other photoelectric tubes so that light striking on any of the photoelectric tubes will cause actuation of relay 122.

Figure 6:
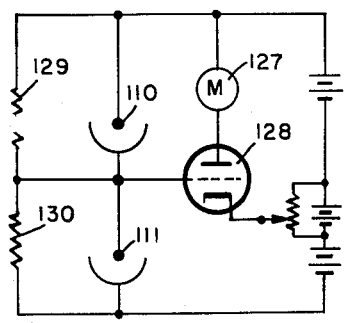
FIGURE 6 is another schematic electrical circuit diagram usable in conjunction with two balanced photoelectric means.

Another electrical circuit for use in connection with the photoelectric cells is shown in FIGURE 6. This circuit is actuated when there is a difference of light incidence on the photoelectric cells. As long as both photoelectric cells receive the same amount of light, meter 127 will show no current flow through tube 128. Whenever one photoelectric tube receives more light than the other, meter 127 will show current flow through electronic tube 128. By equipping this current meter 127 with electric contact means so that deflection of the meter pointer causes closing of an electrical contact, circuit actuation can be obtained for the purpose of providing scoring means whenever the lateral boundaries of the road are exceeded. Resistors 129 and 130, connected across photoelectric tubes 110 and 111 respectively, are provided in order to balance the circuit. The operation of both electronic circuits, that is FIGURE 5 and FIGURE 6, is described in greater detail in "Fundamentals of Industrial Electronic Circuits," (book) first edition, by W. Richter, McGraw-Hill Book Company, 1947, New York, New York, page 505 and pages 508 to 510 respectively.

Figure 7:
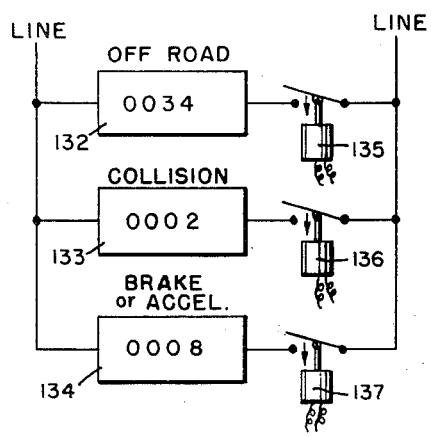
FIGURE 7 is a schematic circuit diagram of the scoring and recording means.

FIGURE 7 illustrates the schematic circuit diagram of a typical scoring circuit which includes three numerical counters, namely numerals 132, 133 and 134 respectively. Counter 132 registers every time an "Off Road" condition is reached, counter 133 registers each occurrence of a "Collision" and counter 134 is operated whenever there is too fast an actuation of either the brake or accelerator control. It will be observed that counter 132 registers when relay 135 is actuated. Relay 135 may be the same relay as relay 122 (FIGURE 5) or it may be another relay operated in response to actuation of relay 122.

The closing of a contact on meter 127 (FIGURE 6) is used to cause a corresponding actuation of relay coil 135. Relay 136 is operated in response to the closing of contact 100 (FIGURE 3), and relay 137 is operated in response to the closing of internal contacts in acceleration and deceleration responsive sensing switch 53 (FIGURE 2). In this manner the trainee's actions and reactions can readily be inspected by reading the respective counters which may be mounted in view of the instructor and/or trainee. Obviously, the counters may have reset means so as to zeroize each counter upon completion of a certain phase.

It will be understood by those skilled in the art that the sensing of "off road" conditions aside from photoelectric means may be accomplished by the use of many other of the well known combinations particularly limit switches, conductive material, etc. without deviating from the broad principle of the instant disclosure.

In some instances it may be desired to shorten the physical length of the terrain means yet to provide an illusion of far distance. A typical means for lengthening the visual path presented to the trainee by using a folded optical path is disclosed and described in U.S. patent to Luther G. Simjian, No. 2,392,781, entitled "Training Apparatus," issued January 8, 1946.

While there have been shown certain specific features and embodiments of the present invention it will be apparent to those skilled in the art that various further and other modifications may be made therein without departing from the spirit and intent of the instant invention which shall be limited only by the scope of the appended claims.

What is claimed is:

1. A training device of the type described comprising: a trainee station; a terrain means movable relative to the trainee station; obstacle storage and retaining means disposed in proximity to said terrain means, and means for selectively dispensing a three-dimensional object from said obstacle retaining means onto said terrain means whereby said obstacle advances toward said trainee station when said terrain means is in motion.

2. In a training device of the type described the combination of: a trainee station; a terrain means visible from said trainee station; an object in view of said trainee station and movable relative to said terrain means by means of controls at said trainee station; said terrain means comprising a surface adapted to move toward said object; means for causing an obstacle to appear on said surface and thereby rendered visible at the trainee station, and said obstacle being movable with said surface toward said object.

3. In a training device of the type described the combination of: a trainee station; a terrain means visible from said trainee station; an object in view of said trainee station and movable relative to said terrain means by means of controls at said trainee station; said terrain means comprising a surface adapted to move toward said object; means for causing a three-dimensional obstacle to be placed on said surface and thereby rendered visible at the trainee station and said obstacle moving toward said object when said surface is in motion, and means for sensing the occurrence of a collision between said obstacle and said object.

4. In a training device of the type described the combination of: a trainee station; a terrain means visible from said trainee station; an object in view of said trainee station and movable laterally relative to said terrain means by means of controls at said trainee station; said terrain means comprising a surface adapted to move in longitudinal direction toward said object; control means at said trainee station for controlling the longitudinal motion of said surface toward the object; means for causing a three-dimensional obstacle to be placed on said surface in order to render it visible at the trainee position and causing said obstacle to move toward said object when said surface is in motion, and means for sensing the occurrence of a collision between said obstacle and said object.

5. A training device as set forth in claim 4 wherein actuation of the means sensing the occurrence of a collision between said obstacle and said object influences subsequent motion of said terrain surface.

6. In a training device of the type described the combination of: a trainee station; an elongated terrain means visible from said trainee station; an object in view of said trainee station and movable laterally relative to said terrain means by means of controls at said trainee station; said terrain means comprising an elongated surface movable in longitudinal direction toward said object in response to controls at said trainee station; means for causing an obstacle to be placed on said surface and thereby rendered visible at the trainee station, and said obstacle being carried by said surface toward said object when said terrain means is in motion.

7. In a training device of the type described the combination of: a trainee position; a movable belt representing a terrain means disposed to render a portion of its top surface visible from said trainee station; an object in view of said trainee station and movable laterally relative to the visible surface of said belt by means of controls at said trainee station; said belt movable in longitudinal direction toward said object in response to controls at said trainee station; means for causing an obstacle to be placed on said belt and thereby rendered visible at the trainee station, and said obstacle being carried by said belt toward said object when said belt is in motion.

References Cited in the file of this patent

UNITED STATES PATENTS

| | | |
|---|---|---|
| 2,273,091 | De Silva | Feb. 17, 1942 |
| 2,319,010 | McLeod | May 11, 1943 |